UNITED STATES PATENT OFFICE.

AZARIAH F. CROWELL, OF WOOD'S HOLL, MASSACHUSETTS.

MANUFACTURE OF FERTILIZERS.

SPECIFICATION forming part of Letters Patent No. 263,322, dated August 29, 1882.

Application filed May 24, 1882. (No specimens.)

*To all whom it may concern:*

Be it known that I, AZARIAH F. CROWELL, of Wood's Holl, in the county of Barnstable, of the State of Massachusetts, have invented a new and useful Improvement in the Manufacture of Fertilizers; and I do hereby declare the same to be described as follows.

On September 24, 1878, Letters Patent No. 208,224 were granted to me for an improvement in fertilizing compounds, and in the process of producing such, the object of the invention being the utilization of the gelatinous and nitrogenous liquid extracted with oil from menhaden or other fish by subjecting such fish to pressure and afterward removing the oil from the said piscinal liquid. The utilization of such gelatinous and nitrogenous liquid was effected by mixing with it a suitable quantity of a superphosphate, and, after allowing the heavier parts of the mixture to settle, removing from it the insoluble substance or substances and evaporating the remainder to dryness or to the necessary consistency. Though my present invention is for a like or analogous purpose, it differs materially from the said patented one, for in carrying out the former I take a quantity of dog-fish, menhaden, or other suitable fish and place it in a tank or proper vessel, and add to such fish a suitable amount of superphosphate—that is, one or about one part, by weight, of the superphosphate to six parts of the fish. I next apply heat at a temperature of 212° Fahrenheit, or thereabout, by steam or other suitable means to the mixture, and thoroughly cook it, allowing, if desirable, a portion of the piscinal fluid to evaporate. This process of cooking the fish usually requires about twenty minutes of time; but this will vary, according to the kind of fish treated, the cooking being carried on until about twenty per cent. of the water of the fish has been evaporated or carried off. Next, I remove the mass from the tank or vessel, and in and by means of a suitable press I subject the mass to pressure in order to extract from it the oil and the gelatinous and phosphatic liquid; or I compress the mass in the tank or otherwise treat it therein, so as to separate the oil and gelatinous and phosphatic liquid from the insoluble or solid residuum. The oil, by its specific levity, will rise in the piscinal nitrogenous fluid, and may be skimmed or otherwise removed therefrom. The gelatinous, nitrogenous, and phosphatic liquid so produced and separated from the oil may be used to advantage as a fertilizing material or in the manufacture of fertilizing compositions.

From the above it will be seen that instead of first pressing the fish to extract from it the oil and gelatinous and nitrogenous liquid, and afterward mixing with the latter a superphosphate, as by my patented process, I by my new process, hereinbefore described, mix the fish and superphosphate together and cook the mixture by heat, whereby I am enabled to obtain from the fish a greater amount of the gelatinous and nitrogenous matters and oil, and to combine to greater advantage or in a greater amount the soluble parts of the superphosphate with the said gelatinous and nitrogenous matters, the oil being subsequently separated from such matters and soluble parts of the superphosphate. I am further enabled by said process to combine or mix at the same time the insoluble parts of the superphosphate with the fish scrap or pomace, whereas by my former patented process this combination or mixture had to be effected at another time and at an increase of expense. Consequently I do not herein claim to first press from the fish the oil and gelatinous and nitrogenous liquid and afterward mix with the said liquid a superphosphate, and remove from the mixture the insoluble substance or substances, and evaporate the remainder to the necessary consistency. My new process involves the employment of heat and the cooking of the fish mixed with the superphosphate, such not constituting a part of my former or patented process. Therefore, What I herein claim as my invention is as follows, viz:

In the manufacture of liquid fertilizer, the process of obtaining from fish its gelatinous and nitrogenous properties, combined with the soluble parts of a superphosphate, such consisting in mixing together the fish and superphosphate and cooking the mixture by heat and subsequently subjecting it to pressure, so as to expel from it the oily, nitrogenous, and phosphatic liquid.

AZARIAH F. CROWELL.

Witnesses:
R. H. EDDY,
E. B. PRATT.